Jan. 14, 1930.  F. H. GOODRICH ET AL  1,743,207
BUMPER
Filed Nov. 18, 1926
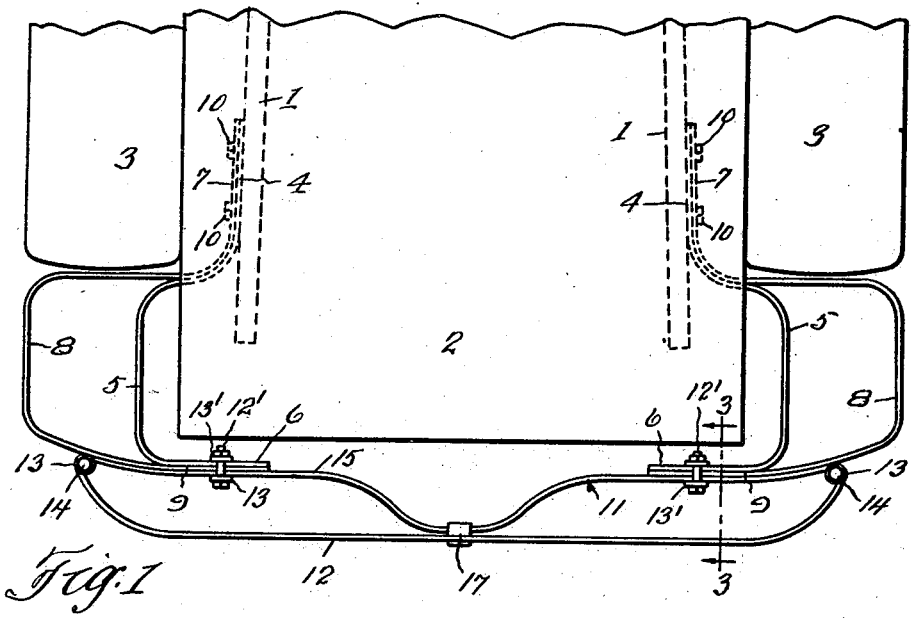
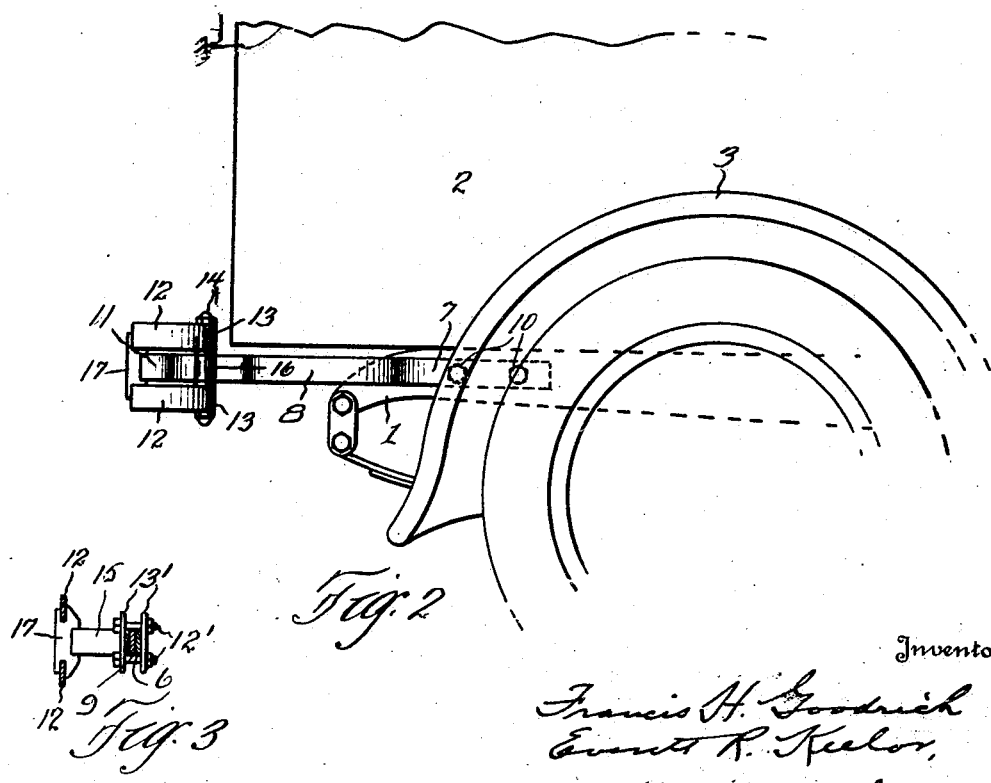
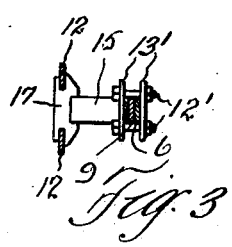

Patented Jan. 14, 1930

1,743,207

UNITED STATES PATENT OFFICE

FRANCIS H. GOODRICH AND EVERETT R. KEELOR, OF DETROIT, MICHIGAN, ASSIGNORS, BY MESNE ASSIGNMENTS, TO GENERAL SPRING BUMPER CORPORATION, A CORPORATION OF MICHIGAN

BUMPER

Application filed November 18, 1926. Serial No. 149,049.

This invention relates to bumpers for automobiles, and more particularly to combined bumpers and bumper-supporting means which are adapted to protect the rear end and the fenders of an automobile having a body projecting beyond such fenders.

It is the general purpose and object of the invention to provide a bumper and bumper-supporting means which will afford effective protection for the fenders and body of an automobile of the type referred to. A further object of the invention is to provide a combined bumper and supporting means therefor which is comparatively simple of construction and inexpensive of production and which can be quickly and conveniently assembled.

We accomplish the foregoing objects by the construction and arrangement of parts shown in the drawings hereof, wherein Fig. 1 represents a plan view of the rear end of an automobile having applied thereto a bumper constructed in accordance with our invention; Fig. 2 a side elevation of the rear end of such automobile showing the bumper in place; and Fig. 3 a detail in section taken on the line 3—3 of Fig. 1.

Describing the various parts by reference characters, 1 denotes the rear portions of the side members and 2 the body of an automobile, the body projecting rearwardly a considerable distance beyond the fenders 3.

Secured to each of the side members 1 is a combined fender-protecting bumper and rear-bumper support, the same comprising a pair of bars each secured at its inner or front end to the rear portion of a side member and at its rear or outer end to a transversely extending bumper, the said bars being bowed outwardly and nested the one within the other whereby the inner bar reinforces the outer bar, and particularly the fender-protecting portions of the latter.

Each inner bar has a front end 4 which engages and is secured to the outer side of one of the members 1, and outwardly extending intermediate portion 5 which projects across the inner portion of a fender 3, and a rear portion 6, which is shown as extending at substantially right angles to the portion 4 and is secured to a transverse bumper, which will be described hereinafter.

Each outer bar comprises a front end portion 7, similar to the front end portion 4 and preferably secured thereto and to the cooperating member 1 by bolts 10; also an outwardly bowed intermediate portion 8, and an inwardly extending end portion 9 which engages the rear face of the portion 6 of the first bar and is secured thereto and to a part of the cross bumper 11 by bolts 12' and clamping plates 13'.

The transverse bumper 11 may be of any standard construction, the one shown herein being of the type disclosed and claimed in the patent to McGregor No. 1,372,154, issued January 17, 1921. The said bumper comprises a pair of vertically spaced impact bars 12 having eyes 13 at the ends thereof which eyes are connected by bolts 14 to eyes 16 interposed between the eyes 13 and carried by the auxiliary bar 15, which bar preferably has its central portion projected toward and connected to the impact bars by any suitable clamping means, as indicated at 17.

It will be noted that the inner portions 6 and 9 of the bars 5 and 8 respectively conform in contour to the auxiliary bar 15, whereby each part 9 engages the bar 15 throughout a considerable portion of its length and both portions 6 and 9 of the supporting bars reinforce the said bar 15. It will be noted that the outwardly bowed portion 8 of each of the bars 7—9 extends substantially as far as the outer edge of the fender 3 adjacent thereto and that the combined supporting arm and bumper-member 4, 5, 6 is nested within the supporting arm and bumper member 7, 8, 9. The construction described provides a strong but resilient protection for the rear end of the automobile and for the fenders, and the outwardly bowed parts or loops 8 serve also to protect the rear portion of the body 2 from blows directed toward such body between the fenders 3 and the outer ends of the bumper 12—17. The bumper construction shown herein is particularly useful when applied to the rear of automobiles, and hence the terms "front" and "rear" have been employed herein in describing the relative arrangement of the parts. However, by such language, we do not propose to limit our invention to use with any particular part of an automobile.

Having thus described our invention, what we claim is:—

1. The combination, with the side members and fenders of an automobile, of a bar secured at one end to each side member and having a portion extending outwardly across a portion of the fender and a rear portion extending inwardly, a second bar also secured at one end to each of the side members, each of the second mentioned bars having an intermediate portion extending across the fender adjacent thereto and a rear end portion extending inwardly, a transverse bumper, and means for securing the said bumper to the inwardly extending portions of the first-mentioned bars.

2. The combination, with the side members and fenders of an automobile, of a pair of inner fender-protecting bars each having an end portion secured to one of said side members and an intermediate looped portion extending partly across the fender adjacent thereto and an inwardly extending rear end portion, a pair of outer fender-protecting bars each having an end secured to one of the side members and a looped portion receiving the looped portion of one of the first mentioned bars and projecting across the fender adjacent thereto, each of the second mentioned bars having an inwardly extending rear end portion, a transverse bumper, and means for securing the rear end portions of the said bars to the said bumper.

3. The combination, with the side members and fenders of an automobile, of a pair of inner fender-protecting bars each having an end portion secured to one of said side members and an intermediate looped portion extending partly across the fender adjacent thereto and an inwardly extending rear end portion, a pair of outer fender-protecting bars each having an end secured to the corresponding end of one of the first mentioned bars and to one of the side members and a looped portion receiving the looped portion of one of the first mentioned bars and projecting across the fender adjacent thereto, each of the second mentioned bars having an inwardly extending rear end portion engaging the corresponding end portion of one of the first mentioned bars, a transverse bumper, and means for securing the rear end portions of the said bars to the said bumper.

4. The combination, with the side members and fenders of an automobile, of a pair of inner fender-protecting bars each having an end portion secured to one of said side members and an intermediate looped portion extending partly across the fender adjacent thereto and an inwardly extending rear end portion, a pair of outer fender-protecting bars each having an end secured to one of the side members and a looped portion receiving the looped portion of one of the first mentioned bars and projecting across the fender adjacent thereto, each of the second mentioned bars having an inwardly extending rear end portion engaging the corresponding end portion of one of the first mentioned bars, a transverse bumper having a bar, the outer end portions of which are engaged by the inwardly extending end portions of the second mentioned bars, and means for securing the rear ends of the first and second mentioned bars to the bar of the said transverse bumper.

5. The combination, with the side members and fenders of an automobile, of a transverse bumper at the rear of said automobile, and means for supporting the said transverse bumper from the said side members, the said means comprising a pair of bars on each side of the automobile each pair having ends secured to one of the frame members and each having an outwardly extending looped intermediate portion, the loop on each inner bar being nested within the loop on each outer bar, the loops on the outer bars extending across the fenders respectively adjacent thereto and the said bars having inwardly extending rear ends, and means connecting the rear ends of said bars to the said transverse bumper.

6. The combination, with the side members and fenders of an automobile, of a rear transverse bumper comprising one or more impact bars and a forward or auxiliary bar connected at its ends to the impact bar or bars and having its intermediate portions spaced therefrom, and means for supporting the said bumper from the said members, the said means comprising an inner and an outer bar on each side of the automobile having their front ends connected to the adjacent side member and each having an outwardly projecting intermediate looped portion, the looped portion of the outer bar extending across the fender adjacent thereto and the looped portion of the inner bar being nested within the looped portion of the outer bar, the rear portions of the supporting bars extending inwardly and conforming to the front side of the auxiliary bar of the transverse bumper, and means for securing the rear ends of said supporting bars to the said auxiliary bar.

7. The combination, with a vehicle and a bumper adapted to protect the rear end thereof, of a support bar connected at one end portion to the vehicle and at the other end portion to the bumper and having a portion intermediate its ends bowed outwardly to extend across a fender of the vehicle, and a brace extending between the inner portions of said bowed support bar.

8. The combination, with a vehicle having a body which extends further than the extremities of the fenders, and a bumper adapted to protect the end of said body, of a support bar connected to the side of the vehicle and to the bumper and extending across a fender to protect the same.

9. The combination, with a vehicle bumper having a body which extends further to the rear than the fenders, of a bumper adapted to protect the rear end of said body, a support for said bumper comprising a bar fastened at one end portion to the side of the vehicle and at the other to the bumper, said support bar having an outwardly bowed intermediate portion adapted to protect the fender, and a brace between inner portions of said bowed support bar.

10. The combination, with a vehicle having a body which extends further than the extremities of the fenders, of a bumper comprising longitudinally spaced members adapted to protect the end of a vehicle and laterally spaced members adapted to protect the side of the vehicle and the fenders.

11. The combination, with a vehicle, of a bumper comprising an impact section adapted to protect the end of the vehicle and a pair of support bars therefor each having looped portions adapted to extend across and protect a fender of the vehicle, and a brace between the inner ends of each such looped portion.

12. The combination with a vehicle having a body which extends beyond the extremities of the fenders, of an impact section adapted to protect the end of the body, support arms therefor having looped portions adapted to extend across and protect the fenders of the vehicle, and braces for such looped portions between the sides of the vehicle and the outer extremities of the loops.

13. The combination with a vehicle having fenders thereon, of a bumper impact section adapted to be supported from the vehicle and spaced from said fenders, and separate support arms for said impact section, said support arms being connected to the vehicle and to the bumper and having a section intermediate these points of connection extending from the outer ends of the impact section to points close to the fenders and substantially in alignment with the outer edges thereof.

14. The combination with a vehicle having fenders thereon, of a bumper impact section adapted to be supported from the vehicle and spaced from said fenders, separate support arms for said impact section, said support arms being connected to the vehicle and to the bumper and having a section intermediate these points of connection extending from the outer ends of the impact section to points close to the fenders and substantially in alignment with the outer edges thereof, and braces extending between the impact section and the vehicle and spaced inwardly from the outer extensions of the support arms.

15. The combination with a vehicle bumper including an impact section and an auxiliary section having an arched portion adapted to brace the middle portion of the impact section, of support arms attached to the vehicle at one end portion and to the bumper at the other, said support arms being bowed outwardly beyond the ends of the bumper intermediate their ends to extend across and protect fenders of the vehicle.

16. The combination with a vehicle bumper including an impact section and an auxiliary section having an arched portion adapted to brace the middle portion of the impact section, of support arms attached to the vehicle at one end portion and to the bumper at the other, said support arms being bowed outwardly beyond the ends of the bumper intermediate their ends to extend across and protect the fenders of the vehicle, and a brace extending between the vehicle and the bumper, said brace being spaced inwardly from the outer extensions of the support arms.

17. The combination with a vehicle bumper including an impact section and an auxiliary section having an arched portion adapted to brace the middle portion of the impact section, of support arms attached to the vehicle at their inner ends and to the bumper at their outer ends, said support arms being bowed outwardly beyond the ends of the bumper and substantially in alignment with the outer edge of the fenders of the vehicle.

18. The combination with a vehicle bumper including an impact section and an auxiliary section having an arched portion adapted to brace the middle portion of the impact section, of support arms attached to the vehicle at their inner ends and to the bumper at their outer ends, said support arms being bowed outwardly beyond the ends of the bumper and substantially in alignment with the outer edge of the fenders of the vehicle, a brace extending between the vehicle and the bumper, said brace being spaced inwardly from the outer extremities of the support arms.

In testimony whereof, we hereunto affix our signatures.

EVERETT R. KEELOR.
FRANCIS H. GOODRICH.